March 23, 1926.
H. HANSEN
MILK STRAINER AND FILTER
Filed June 1, 1925
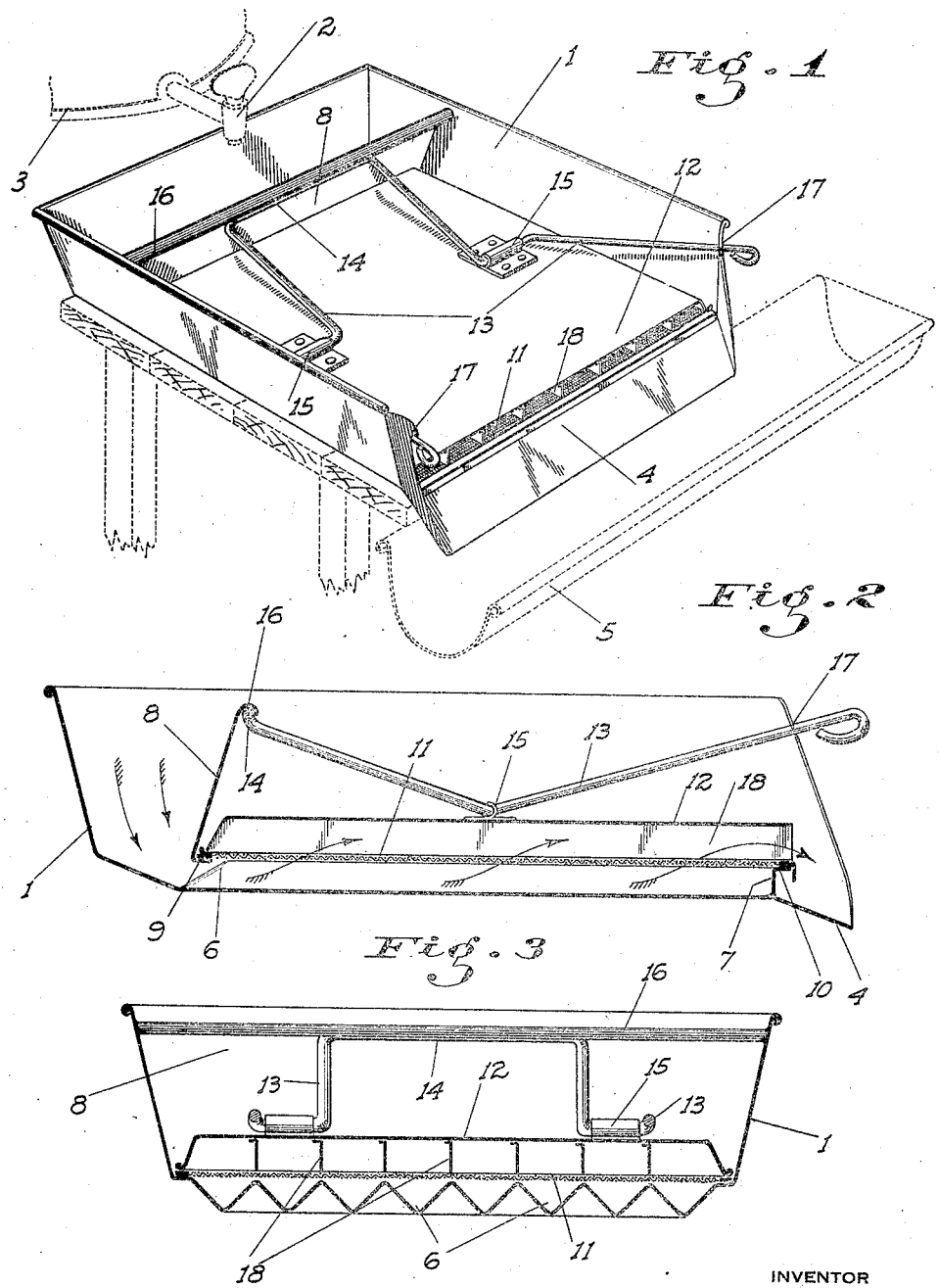
INVENTOR
*Henry Hansen*
BY *Perry J. Webster*
ATTORNEY Patented Mar. 23, 1926.

1,577,746

UNITED STATES PATENT OFFICE.

HENRY HANSEN, OF MODESTO, CALIFORNIA.

MILK STRAINER AND FILTER.

Application filed June 1, 1925. Serial No. 33,961.

*To all whom it may concern:*

Be it known that I, HENRY HANSEN, a citizen of the United States, residing at Modesto, county of Stanislaus, State of California, have invented certain new and useful Improvements in Milk Strainers and Filters; and I do declare the following to be a full, clear, and exact description of the same, reference being had to the accompanying drawings, and to the characters of reference marked thereon, which form a part of this application.

This invention relates to improvements in liquid straining and filtering devices, and particularly to one especially intended for use in treating milk.

The principal object of my invention is to provide a device for the purpose so constructed that milk being passed through the device must pass upwardly through the strainer or filtering element, while any foreign matter originally with the milk is deposited below said element. This prevents the element from becoming clogged with sediment and the like and of course enables the same to function to better advantage.

Another object of the invention is to arrange the several parts of the structure in such a manner that they may be easily and quickly disassembled from each other for cleaning purposes.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of the device.

Figs. 2 and 3 are longitudinal and cross sections respectively of the same.

Referring now more particularly to the characters of reference on the drawings, the numeral 1 denotes a pan into one end of which the milk flows from the faucet 2 of a supply tank indicated at 3. The end of the pan opposite the intake is open and formed with a downwardly sloping apron 4 which discharges into the usual cooling trough indicated at 5.

The bottom of the pan is formed as a series of longitudinal grooves with intermediate ridges as shown at 6. The grooves are open to the pan at the intake end thereof but closed at the apron end by a transverse wall 7. The milk flowing along the grooves must therefore rise above the top of the grooves before it can flow onto the apron.

Secured in the pan adjacent the head end of the grooves and extending from the top of the pan to the top of said grooves is a transverse partition or wall 8. This wall is formed along its bottom with a horizontal flange or ledge 9 facing toward the apron, while the rear wall 7 is formed with a similar ledge 10 along its upper edge. These ledges are substantially in horizontal alinement with the pan surface at the top of the grooves.

Removably supported on said ledges and also resting on the bottom of the pan at the top of the outermost grooves is a strainer or filter element 11. This element is in the form of a single flat sheet which extends the full width between the side walls of the pan and for the full distance between the ledges, so that the entire grooved area of the pan is covered by said element. For straining purposes a wire cloth is preferably used; while for filtering, cotton or similar cloth would be employed.

This element is removably held in place by an inverted pan 12 having three sides only, the rear side above the rear end of the grooves being open as shown. These three sides rest on the element 11 above the ridge 9 and the bottom of the pan along the sides thereof. The pan 12 is clamped in position by a suitable means such as a heavy spring wire clamp. This clamp comprises longitudinal members 13 connected at their ends opposite the apron 4 by a crossbar 14, the opposite ends of said members tending to rise away from the center thereof.

The members 13 are pivoted intermediate their ends onto the pan 12 as shown at 15.

The bar 14 is adapted to pass under the lip 16 formed along the upper end of the wall 8, while the rear ends of the members 13 are adapted to be then depressed so as to pass under hooks 17 formed with the sides of the pan 1 at the rear ends thereof. The clamp is then in tension and the pan 12 is then placed under pressure causing it to hold the element 11 firmly in place.

To prevent the element from bulging upwardly intermediate its clamped edges, the pan 12 is provided with longitudinal strips 18 vertically alined with the top of the ridges intermediate the grooves 6, and depending from the pan 12 so that there is just room for the element 11 to lie between said ridges and strips.

In operation it will be seen that milk flowing into the pan from the faucet 2 must pass along the grooves 6, owing to the presence of the transverse partition 8, which extends down to the forward ends of said grooves.

Since the milk cannot escape from the rear ends of the grooves owing to the end wall 7, it must pass up through the element 11, when the level of the milk in the head end of the pan 1 is higher than the element 11. Any sediment with the milk as it flows along the grooves will therefore be finally deposited in the bottom of the grooves instead of settling on the screening element.

The rear end of the pan 12 above the element 11, being open, the milk can flow from above the element onto the apron 4 and thence into the trough 5.

To clean the apparatus it is only necessary to disengage the clamp from its holding means, when the said clamp together with the pan 12 to which it is attached may be readily slid out and raised up from the element 11 and pan 1. Said element is therefore fully exposed and may be similarly removed, from the pan, which in turn fully exposes the grooves 6 of the pan. The three parts of the structure may therefore be individually and thoroughly cleaned, as will be evident.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A liquid filter including a pan having an outlet at one end and adapted at its opposite end to receive the liquid to be filtered whereby such liquid will tend to flow from the receiving to the outlet end of the pan, the pan having longitudinal grooves closed at their rear ends, a filtering element over the grooves and making a closure with the rear ends thereof, and means whereby liquid received into the pan can pass only along the grooves, whereby to reach the outlet end of the pan the liquid must pass upwardly through the element.

2. A liquid filter including a pan having an outlet at one end and adapted at its opposite end to receive the liquid to be filtered whereby such liquid will tend to flow from the receiving to the outlet end of the pan, the pan having longitudinal grooves closed at their rear ends, a filtering element over the grooves and making a closure with the rear ends thereof, and a transverse wall in the pan projecting upwardly from the filtering element at the forward end thereof.

3. A liquid filter including a pan adapted to receive and discharge liquid, a sheet of filtering material resting in the pan, means whereby the liquid after being received in the pan must pass upwardly through the sheet, and a common means for removably holding the sheet in place in the pan and for preventing the same from buckling upwardly intermediate its edges.

4. A liquid filter including a pan open at one end and adapted at its opposite end to receive the liquid to be filtered whereby such liquid will tend to flow from the receiving to the open end of the pan, the pan having longitudinal grooves closed at their ends, a transverse wall in the pan projecting upwardly from the forward and upper ends of the grooves, horizontally alined ledges in the pan, along the bottom of the wall and the rear closure of the grooves, and a filtering sheet resting on said ledges.

5. A structure as in claim 7, in which means is applied to the sheet to hold the same in removable but firm engagement with the ledges.

6. A liquid filter including a pan open at one end and adapted at its opposite end to receive the liquid to be filtered whereby such liquid will tend to flow from the receiving to the open end of the pan, the pan having longitudinal grooves closed at their ends, a transverse wall in the pan projecting upwardly from the forward and upper ends of the grooves, horizontally alined ledges in the pan, along the bottom of the wall and the rear closure of the grooves, a filtering sheet resting on said ledges, and an inverted pan open at that end corresponding to the open end of the first named pan; the sides of the pan alining with said ledges and resting on the sheet thereabove.

7. A liquid filter including a pan adapted to receive and discharge liquid, a filtering sheet in the pan, ledges supporting the sheet, means whereby the liquid after being received in the pan must pass upwardly through the sheet, a member above the sheet engaging that portion thereof resting on the ledges, and clamping means, releasable at will, between the pan and said member.

8. A liquid filter including a pan open at one end and adapted at its opposite end to receive the liquid to be filtered whereby such liquid will tend to flow from the receiving to the open end of the pan, the pan having longitudinal grooves closed at their ends, a transverse wall in the pan projecting upwardly from the forward and upper ends of the grooves, horizontally alined ledges in the pan, along the bottom of the wall and the rear closure of the grooves and a filtering sheet resting on said ledges, an inverted pan whose sides aline with said ledges and rest on the sheet thereabove, and longitudinal strips in said inverted pan depending toward the sheet, said strips being in alinement with the bottom of the first named pan between the grooves.

In testimony whereof I affix my signature.

HENRY HANSEN.